United States Patent [19]

Lucki et al.

[11] Patent Number: 5,018,421
[45] Date of Patent: May 28, 1991

[54] SAW BLADE TOOTH GEOMETRY

[75] Inventors: Walter J. Lucki, Agawam; Gerald H. Tober, Longmeadow, both of Mass.

[73] Assignee: Armstrong-Blum Manufacturing Company, Ltd., Agawam, Mass.

[21] Appl. No.: 178,498

[22] Filed: Apr. 7, 1988

[51] Int. Cl.$^5$ .............................................. B23D 61/00
[52] U.S. Cl. ........................................ 83/835; 83/661
[58] Field of Search ................ 83/661, 835, 846, 847, 83/848, 836, 839; 76/112

[56] References Cited

U.S. PATENT DOCUMENTS

| | | | |
|---|---|---|---|
| 1,354,439 | 9/1920 | McCormick | 83/661 |
| 2,126,382 | 8/1938 | Goff et al. | 83/661 |
| 3,736,828 | 6/1973 | Funakubo | 83/661 |
| 3,973,455 | 8/1976 | Slaats et al. | 83/846 |
| 4,640,172 | 2/1987 | Kullmann et al. | 83/835 |
| 4,727,788 | 3/1988 | Yoshida et al. | 83/848 |

FOREIGN PATENT DOCUMENTS 2044171 10/1980 United Kingdom ................ 83/835

*Primary Examiner*—Frank T. Yost
*Assistant Examiner*—Rinaldi Rada
*Attorney, Agent, or Firm*—Fishman, Dionne & Cantor

[57] ABSTRACT

A saw blade of the welded-edge or chemically homogeneous type having a tooth geometry featuring a positive rake angle and a radial relief back for cutting both structural and solid materials.

4 Claims, 2 Drawing Sheets

SAW BLADE TOOTH GEOMETRY

BACKGROUND OF THE INVENTION

This invention relates to saw blades of the welded edge and chemically homogeneous type, i.e. blades made of a single material. In particular, it relates to new and improved tooth geometry for saw blades which employ a positive rake angle and a radial relief back.

It has long been recognized that structural and solid metal cutting saw blades for band saws and hack saws need certain qualities if they are to function in an efficient manner. For example such blades must be strong, smooth running, have good heat dissipation and have a long life, i.e. remain sharp.

The above and other desirable features of saw blades are achieved in two basic ways: first, through tooth geometry i.e. gullet size, relief angles, rake angle, wedge angle, as well as tooth size and pitch and second, blade construction i.e. solid blades and welded-edge blades.

It is known, for example, that welded edge blades exhibit a tooth tip portion of a high hardness, high strength material and a base portion of a strong flexible material. A typical construction is disclosed in U.S. Pat. No. 4,292,871 to Neumeyer et al, which is incorporated herein by reference. It is also known that some blades which provide for reduced vibration, noise, chatter, etc. can be prepared by the arrangement and form of the teeth. For example, see U.S. Pat. Nos. 4,179,967 to Clark and 4,232,578 to Stellinger et al.

Despite the ready availability of known and useful, commercially accepted standard tooth geometries, some of which maybe found in wood cutting blades, it has been found that unlike wood cutting applications various metal cutting applications require special blade tooth geometries and special blade constructions. In such situations it is particularly useful if the advantages of various blade tooth geometries enhance the known advantages of special blade construction.

It is therefore an object of the present invention to provide a new tooth geometry for saw blades which will provide strength, good heat dissipation, smooth cutting and long life.

It is another object of the present invention to provide a new tooth geometry for use with metal cutting welded-edge blades as well as chemically homogeneous blades.

It is a further object of the present invention to provide an improved tooth geometry for a metal cutting saw blade which has a positive rake angle and increased tooth mass while maintaining a large gullet for efficient chip removal.

It is a still further object of the present invention to provide improved tooth geometry for welded-edge saw blades wherein a long weld line between the tooth and the backing blade is employed thus providing a stronger bond between the two.

The above and other objects and advantages of the present invention will become more apparent when considered in connection with the following description and accompanying drawings.

DESCRIPTION OF THE PREFERRED EMBODIMENTS

Figure 1:
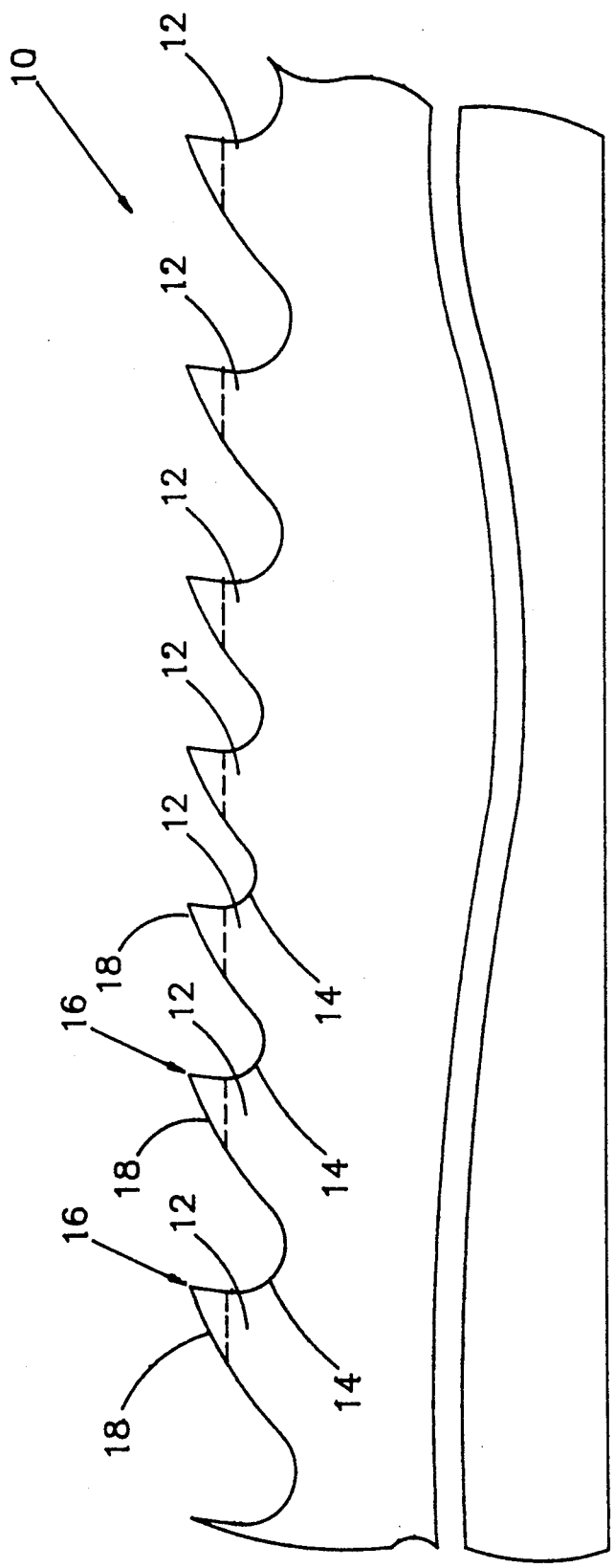
FIG. 1 is an enlarged side view of a segment of a saw blade embodying the present invention.
Figure 2:
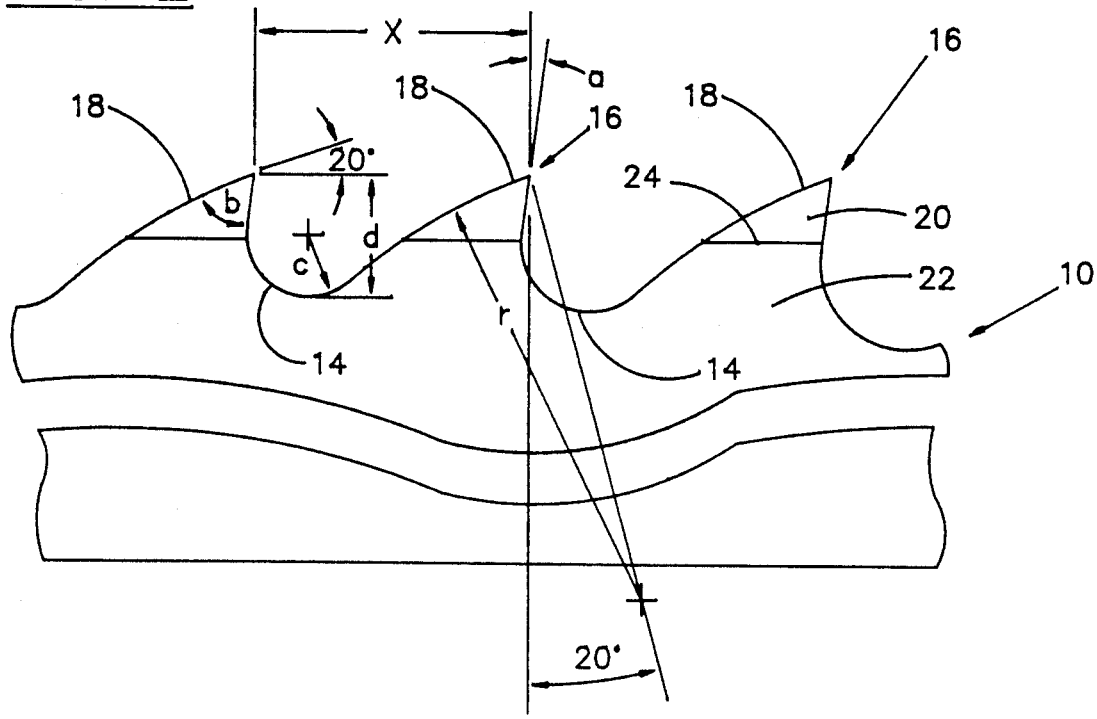
FIG. 2 is an enlarged side view of a portion of the saw blade segment shown in FIG. 1.

As shown in FIGS. 1 and 2, a welded-edge type saw blade 10 is provided with a plurality of teeth 12 separated by gullets 14. In the embodiment shown, a variable pitch saw blade is depicted, i.e. the distance "x" between apices 16 of adjacent teeth 12 varies from tooth to tooth whereby the pitch is defined as the reciprocal of the distance "x" (in inches).

As will be noted, each tooth 12 is provided with a positive rake angle "a" and a radial relief back 18. Each tooth also includes a substantial tip including angle "b", a gullet radius "c" and a depth "d". The radial relief back 18 dimension "r" is determined by the relationship between the pitch, depth, gullet radius and a 15° to 20° tangential plane at the tip of each tooth 12. The radial relief back starts at the tooth tip which is the intersection of a line formed by the toothed edge and a line inclined from 15° to 20° from said toothed edge. The radius of the radial relief back is located on a line perpendicular to the inclined line which runs through the intersection of the toothed edge line and the inclined line.

In order to provide the advantages of the present invention in a saw blade, the positive rake angle "a" should be no less than 7° and no more than $12\frac{1}{2}°$, preferably $7\frac{1}{2}°$; the tip included angle "b" should be between 61° and 64° preferably $62\frac{1}{2}°$; the depth of each tooth should be about 0.5 times the reciprocal of the pitch; and the gullet radius should be equal to about 0.23 to 0.24 times the reciprocal of the pitch of the tooth.

When one employs the above noted tooth geometry, one is able to create a longer cross-sectional area at the weld line, up to about 45% above known designs, thus increasing the tooth shear strength and reducing the tendency to strip teeth on structural applications. In addition, the greater tip mass due to the unique geometry of the radial relief back gives faster heat dissipation and reduces tip temperature so as to maintain high tip hardness.

Figure 3:
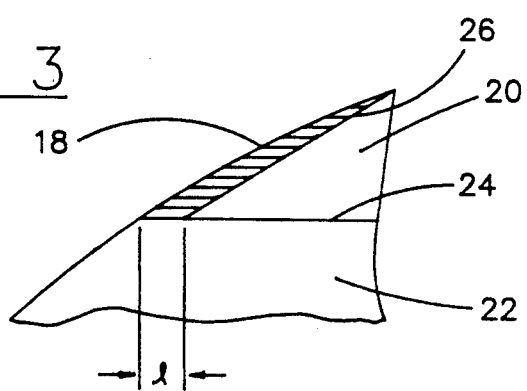
FIG. 3 is an enlarged side view of the upper portion of a tooth of the saw blade segment shown in FIG. 1.

In illustration of the above, FIG. 3 depicts a portion of a tooth created using the design criteria of the present invention. As shown, a tip portion 20 is welded, preferably by electron beam welding techniques, to a base portion 22 along weld line 24. Line 26 illustrates a typical angular relief back and the cross hatching illustrates the increased surface area of a tooth provided by the radial relief back 18 of the present invention. As illustrated, the dimension "l" is the increased length of the weld line 24 provided by the present invention.

In order to illustrate the basis of the present invention, the working dimensions of a variable pitch, welded-edge saw blade employing the teachings of the present invention are shown in Table I below:

TABLE I

| Tooth # | Rake Angle-"a" | Gullet Radius-"c" | Distance Between Teeth-"x" | Tooth Depth-"d" | Tip Included Angle-"b" | Radial Relief "r" | Weld Length |
|---|---|---|---|---|---|---|---|
| 1 | 7½° | .058 | .250 | .115 | 62½° | .4539 | .092 |
| 2 | 7½° | .053 | .230 | .105 | 62½° | .4284 | .090 |
| 3 | 7½° | .042 | .185 | .083 | 62½° | .3648 | .085 |
| 4 | 7½° | .038 | .170 | .075 | 62½° | .3557 | .078 |
| 5 | 7½° | .042 | .185 | .083 | 62½° | .3648 | .085 |
| 6 | 7½° | .053 | .230 | .105 | 62½° | .4284 | .090 |
| 7 | 7½° | .058 | .250 | .115 | 62½° | .4539 | .092 |

NOTE: All dimensions are in inches unless otherwise noted.

In comparison and contrast to the above, a typical non-radial relief back welded-edge saw blade would have weld length of about .062 inches for each tooth.

The variable pitch, welded-edge saw blade illustrated in Table I was subjected to testing along with 4 commercially available blades and a second blade made in accordance with the present invention as follows:

Blade #1-4/6 welded-edge, 5° positive rake, bent tip Hardness RC 66.6 (commercially available blade)

Blade #2-4/6 welded-edge, 5° positive rake, bent tip Hardness RC 66.4 (commercially available blade)

Blade #3-4/6 welded-edge, 0° rake, straight relief back-Hardness RC 67.4 (commercially available blade)

Blade #4-4/6 welded-edge, 0° rake, straight relief back-Hardness RC 65.5 (commercially available blade)

Blade #5-4/6 welded-edge, 7 ½° positive rake-Hardness RC 63.9

Blade #6-4/6 welded-edge, 7 ½° positive rake-Hardness RC 65.5

Each of the above noted blades were used in test cuttings of a 6 inch I-beam under the following conditions:

|  | Speed | Feed |
|---|---|---|
| Cuts 1-5 | 150 fpm | 75 lbs. |
| Cuts 6-100 | 250 fpm | 100 lbs. |

During the cutting tests, sound readings were taken and the results are as follows:

TABLE II

|  | 6" from cut | 3' from cut |
|---|---|---|
| Blade #1 | 108 db | 97 db |
| Blade #2 | 108 db | 97 db |
| Blade #3 | 99 db | 92 db |
| Blade #4 | 99 db | 92 db |
| Blade #5 | 99 db | 92 db |
| Blade #6 | 99 db | 92 db |

As will be noted from the above, blades 5 and 6 made in accordance with the present invention exhibited an operating sound level at least as good as or better than the other blades tested.

Following the 100th cut, each of the blades were examined under a low power (10X) binocular microscope and evaluated for fracture and tooth wear. The following Table lists the results of said examination:

TABLE III

|  | Tooth Fracture Per Foot @ 100th Cut | Wear Least = 1 Worst = 6 |
|---|---|---|
| Blade #1 | 2.5 | 3 |
| Blade #2 | 4.0 | 4 |
| Blade #3 | 9.0 | 6 |
| Blade #4 | 13.5 | 5 |
| Blade #5 | 0 | 2 |
| Blade #6 | 0 | 1 |

As will be noted from the above, Blades 5 and 6 provide superior results. As will also be noted, Blades 5 and 6 are welded-edge blades made in accordance with the teachings of the present invention.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A welded edge saw blade, said blade extending longitudinally along an axis and having a plurality of teeth wherein each tooth has a positive rake angle from about 7° to about 12 ½°, a depth equal to about .5 times the reciprocal of the pitch of said teeth, a gullet radius equal to about .23 to .24 times the reciprocal of the pitch of said teeth, a tip included angle of from about 61° to about 64° and a radial relief back wherein the center of the radius of said radial relief back is on a first line which intersects the tip of a tooth and is disposed from about 15° to about 20° forward of a second line which also intersects said tooth tip and which is perpendicular to the axis.

2. The saw blade of claim 1, wherein the first line is disposed about 20° forward of the second line.

3. The saw blade of claim 2 wherein said positive rake angle is 7 ½°, and said tip included angle is 62 ½°.

4. A welded edge saw blade having a base portion and a tooth portion welded to said base portion, said tooth portion comprising a plurality of teeth wherein each tooth has a positive rake angle of 7 ½°, a depth equal to about .5 times the reciprocal of the pitch of said teeth, a gullet radius equal to about .23 to .24 times the reciprocal of the pitch of said teeth, a tip included angle of 62 ½° and a radial relief back wherein the center of the radius for said radial relief back is on a line which intersects the tip of a tooth and is disposed about 20° forward of a line which also intersects said tooth tip and which is perpendicular to the line formed by the toothed edge of said saw blade whereby the weld between said base portion and each of said teeth is increased thereby providing increased tooth shear strength.

* * * * *